United States Patent [19]

Baitis et al.

[11] 4,380,206

[45] Apr. 19, 1983

[54] SHIP ROLL STABILIZATION SYSTEM

[75] Inventors: A. Erich Baitis, Stafford, Va.; Dennis A. Woolaver, Rockville, Md.

[73] Assignee: The United States of America as represented by the Secretary of the Navy, Washington, D.C.

[21] Appl. No.: 247,484

[22] Filed: Mar. 25, 1981

[51] Int. Cl.³ .............................................. B63B 39/06
[52] U.S. Cl. ................................. 114/122; 114/144 R
[58] Field of Search ............... 114/144 R, 144 E, 150, 114/162; 318/585, 621

[56] References Cited

U.S. PATENT DOCUMENTS

| 2,892,435 | 6/1959 | Ljungström | 114/122 |
| 3,137,265 | 6/1964 | Meyerhoff | 114/122 |
| 3,842,777 | 10/1974 | Larsh | 114/126 |

Primary Examiner—Trygve M. Blix
Assistant Examiner—Jesús D. Sotelo
Attorney, Agent, or Firm—R. F. Beers; L. A. Marsh

[57] ABSTRACT

A ship stabilization system, which utilizes the rudders to compensate for wind and wave induced roll motions, includes a hydraulically actuated mechanism for controlling the position of the rudders; a pump coupled to the hydraulic mechanism for controlling the flow of hydraulic fluid; and a flow control device connected to the pump for controlling the flow rate of fluid through the pump. The ship stabilization system also includes a first actuation device for translating helm steering command signals into control impulses for the flow control device and a second actuation device for translating helm steering command signals and roll reduction control signals into control impulses for the flow control device. A coupler is connected to the first and second actuation devices and the flow control device for disengaging the first actuation device from the flow control device when the second actuation device is activated. The roll reduction signal processed by the second actuation device consists of the instantaneous roll rate of the ship and the statistical gain factor representing the statistical average roll rate during a predetermined period of time.

7 Claims, 2 Drawing Figures

SHIP ROLL STABILIZATION SYSTEM

BACKGROUND OF THE INVENTION

This invention generally relates to motion stabilization systems and more particularly to roll reduction devices used aboard marine vessels.

As a result of the increased importance of helicopters and vertical takeoff-landing aircraft as an integral part of naval combat systems, a major thrust of recent research and development effort in surface ship dynamics has been directed toward improving ship/aircraft interfacing. Since the ship/aircraft interface is strongly dependent on weather, ship motions, and wave impact forces, it is desirable to reduce ship roll motions to minimize the possibility of damage to aircraft during landing and takeoff operations. Accordingly, a particular area of ship stabilization research has involved attempts to utilize the rudder systems of ships to control and reduce the rate and magnitude of ship roll motions. However, problems have been experienced in developing compatible roll reduction systems because of operational interference between use of the rudder in reducing roll motions and utilization of the rudder as a steering mechanism.

SUMMARY OF THE INVENTION

The anti-roll device of the present invention overcomes drawbacks with the prior art by providing a roll reduction system which essentially comprises a hydraulic control means connected to the rudder; a pump means coupled to the hydraulic control means; flow control means connected to the pump means for controlling the flow rate of fluid through the pump means; and a first actuation means connected to the flow control means for translating helm signals into impulses for the flow control means. The roll stabilization device also includes a second actuation means for translating a combined helm and anti-roll signal into impulses for the flow control means. When the second actuation means is coupled to the flow control means and activated, the first actuation means is decoupled from the flow control means. This is accomplished with a mechanical clutch/decoupler which is operatively connected to the first and second actuation means.

The second actuation means includes an electronic actuation control which combines the helm signals with signals from a roll rate sensor to provide a rudder command signal of a predetermined average magnitude. The combined signal from the electronic controller is compared with a signal representative of the instantaneous position of the rudder, and the resultant difference signal is fed to a mechanical actuator that translates the electrical signal into a mechanical impulse for the flow control means. The magnitude of signal fed to the flow control means determines the flow rate of fluid in the hydraulic control means and, thus, the position of the rudder.

Accordingly, an object of the present invention is to stabilize marine vessels against wave and wind induced roll motions.

Another object of this invention is to provide a roll stabilization system for marine vessels which is coupled with the rudder of the ship without affecting the steering of the vessel.

Yet another object of the present invention is the provision of an efficient roll stabilization system which can be adapted to existing steering system designs.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings, in which:

DETAILED DESCRIPTION OF THE INVENTION

Figure 1:
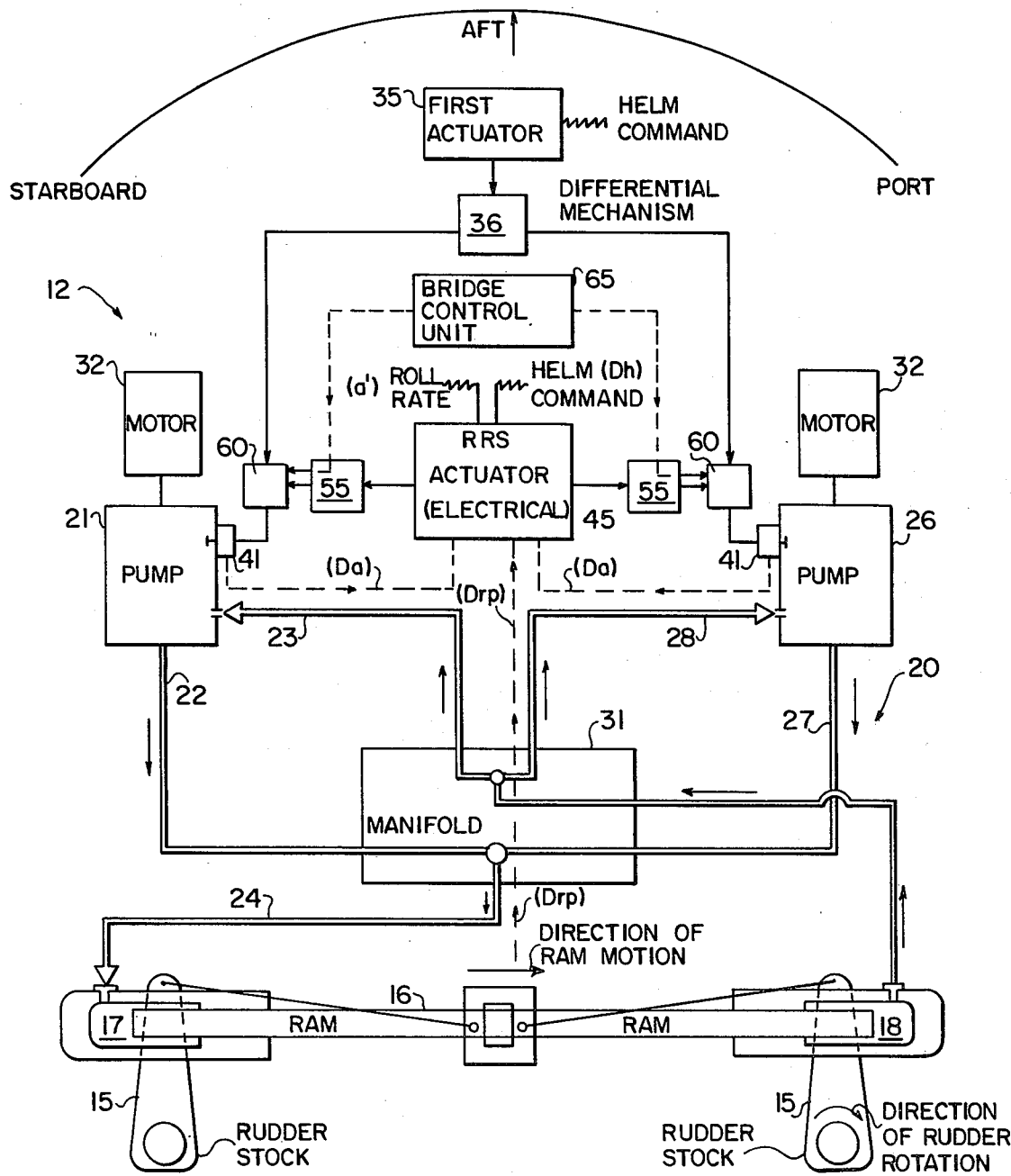
FIG. 1 is a simplified diagramatic view of the roll reduction system of the present invention.
Figure 2:
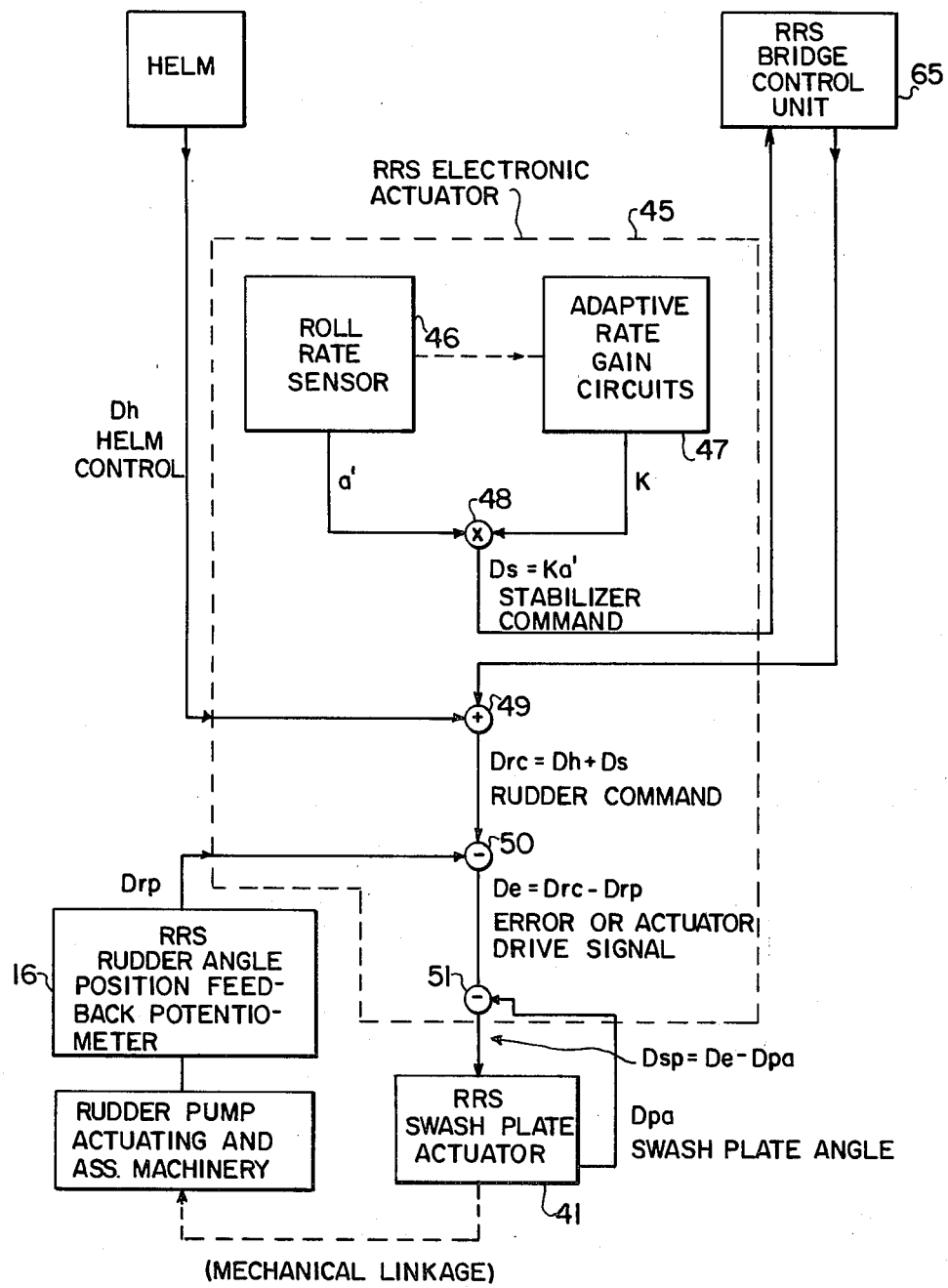
FIG. 2 is a simplified block diagram of the electronic control system of the present invention.

Referring now to the drawings and to FIG. 1 in particular, there is shown a simplified diagram of the roll reduction rudder control system 12 of the present invention. The roll reduction system 12 includes a hydraulically actuated control means in the form of a hydraulic fluid circuit 20 which is coupled to a hydraulic ram mechanism 16 that drives a tandem arrangement of rudders 15. A pump means comprising hydraulic pumps 21,26 and pump motors 32 is interconnected with the hydraulic circuit 20 to produce a preselected fluid flow in the hydraulic circuit 20 that causes ram mechanism 16 to move rudders 15 to a predetermined position. The roll reduction system 12 also includes a hydro-mechanical flow control means in the form of flow controls 41 that are coupled to pumps 21,26 for controlling the flow rate of hydraulic fluid through pumps 21,26; a first actuation means which is connected to flow controls 41 for translating helm signals into impulses for the flow controls 41; and a second actuation means for translating a combined helm and anti-roll signal into impulses for flow controls 41. The second actuation means is coupled to the flow controls 41 so that the first actuation means is decoupled from pumps 21,26 when the second actuation means, as more particularly illustrated in FIG. 2, is activated.

The ram mechanism 16 is pivotally connected to the arrangement of tandem rudders 15 so that a shift of the ram mechanism 16 in one direction causes a corresponding rotation of the rudders 15 in the same direction. More particularly, the end portions of the elongated ram mechanism 16 are contained within hydraulic chambers 17,18 so that a flow of pressurized fluid into chamber 17 causes a corresponding shift of the ram end portion out of the chamber 17. The hydraulic fluid circuit 20 includes two fluid conduits extending from each pump, wherein a flow line from one pump is connected to one of the hydraulic chambers 17 and the other flow line from such pump is connected to the other hydraulic chamber 18. Thus, in FIG. 1 ducts 22 and 23 from pump 21 are connected to respective chambers 17 and 18, and ducts 27 and 28 from pump 26 are connected to respective chambers 17 and 18. To provide a uniform response to impulses from the dual pumps, flow lines 22,27 are merged together into a single conduit 24 at manifold section 31, and flow lines 23,28 are merged together to form a single conduit 29 at manifold section 31.

Pumps 21 and 26 operate in response to the signals from flow controls 41 to cause the hydraulic fluid to flow through the pumps in a predetermined direction to the appropriate ducts and conduits at a predetermined pressure and flow rate. As shown for example in FIG. 1, the signal from flow controls 41, which is often referred to as the swash plate flow controls, has actuated pumps 21,26 to produce a flow of fluid out of right chamber 18 and into left chamber 17 as indicated by the arrows to cause a clockwise rotation of rudders 15. If the signals to the swash plate flow controls 41 change so that is is desired to rotate rudders 15 in a counterclockwise direction, a mechanical impulse is fed to pumps 21,26 to produce a flow of fluid into right chamber 18 and out of the left chamber 17. As rudders 15 approach the predetermined position, the flow of fluid through pumps 21,26 is continuously reduced until the flow rate reaches zero at the desired rudder position. An essential feature of the present invention is that pumps 21,26, hydraulic circuit 20, and ram mechanism 16 are arranged to permit a rapid movement of the rudders 15 in response to appropriate signals from the second actuation means. This may be accomplished, for example, by utilizing a ram mechanism 16 of the type manufactured by Jered Industries, a division of Brown Brothers-Jered Inc., Birmingham, Mich. (eg. Ram, Follow Up Link and Tiller Assembly; part M-20004-B).

A compatible pump 21 or 26 having an integral swash plate flow control 41 is manufactured by New York Air Brake (eg. part #890172, model 45L0172 or Dyna Power Models 30,45,60,120,210). A suitable electric pump motor 32 is manufactured by Reliance Electric Co. (Mil Spec. Mil-M-17060, Navy Service A Frame #286 UN).

The first actuation means includes an electromechanical actuation device 35, such as manufactured by Sperry Marine Division of Sperry Rand (Rotary Hydraulic Power Unit #1880060 or 1883174), that translates electrical helm signals into appropriate signals for a differential mechanism 36. The differential mechanisms 36, such as manufactured Jered Industries (Control Unit #20004-D), are connected to left and right swash plate flow controls 41 and translate the impulses from the first actuator 35 into a mechanical movement of the swash plate flow control 41 to a predetermined position. The relative position of the swash plate flow controls 41 with respect to a neutral position causes pumps 21,26 to operate and produce a specific flow rate in the hydraulic lines.

The second actuation means, as depicted in FIGS. 1 and 2, includes an electrical roll reduction system actuator 45, herein referred to as a second actuator, that translates electrical signals from a roll rate sensor 46 and the helm into appropriate signals for a mechanical actuator 55 that is linked thereto. The particular electrical circuit details of the second actuator 45 are set forth in a copending application entitled "ELECTRICAL ACTUATOR FOR SHIP ROLL STABILIZATION" by Dennis A. Woolaver, Ary E. Baitis, and Richard T. Nigon, Ser. No. 248,389, filed Mar. 31, 1981, the teachings thereof are herein incorporated by reference. The mechanical actuators 55 for the second actuation means are coupled to mechanical clutch/decouplers 60 and the mechanical actuators 55 translate signals from second actuator 45 into mechanical impulses for the swash plate flow controls 41. A more specific operation of the mechanical actuators 55 is set forth in a copending application entitled "MECHANICAL ACTUATION DEVICE FOR SHIP ROLL STABILIZATION" by Dennis A. Woolaver and Ary E. Baitis, Ser. No. 247,485, filed Mar. 25, 1981 the teachings thereof are herein incorporated by reference. Mechanical clutch/decoupler devices 60 interconnect the first and second actuators 35,45 and the swash plate flow controls 41 so that the clutch device 60 disengages the first actuator 35 and differential mechanism 36 from the swash plate flow controls 41 when the second actuation means is activated. The operative details of the mechanical clutch/decoupler device 60 are set forth in a copending application entitled "MECHANICAL CLUTCH/DECOUPLER FOR HYDRAULIC PUMPS" by Dennis A. Woolaver and Ary E. Baitis, Ser. No. 247,486, filed Mar. 25, 1981, the disclosure of which is herein incorporated by reference.

Before beginning a more detailed discussion of the second actuator 45, also referred to as the roll reduction system (RRS) actuator, it is important to define the theory of operation. Essentially, the roll reduction system of the present invention utilizes the rudder 15 to produce a roll moment in the ship which offsets the roll moment induced by the sea. That is, when the ship tends to roll to port due to an instantaneous sea state, the second actuation means produces a clockwise rotation of the rudders 15, to produce a roll moment that tends to roll/displace the bottom of the ship to starboard. A resultant zero rolling motion is produced when the oppositely directed wave induced ship roll and rudder induced roll moment are superimposed. The direction, displacement and phasing of the rudder movements determines how effectively the stabilizing moments are utilized.

Ideally, the roll reduction system operates to produce a rudder angle command signal that causes the maximum possible roll reduction at all frequencies. This could in principle be attained by having the rudder command signal phased so that the rudder moment opposes the wave excitation moment for all wave frequencies. This ideal control, designated as "opposed control", may be represented by:

$$D = Ja + Ka' + La'' \quad (A1)$$

where the values of the individual control gains are related as $$\frac{J}{L} = \omega^2, \frac{K}{L} = 2n\omega \quad (A2)$$

where
D = rudder angle
a = roll angle
a' = roll velocity or roll rate
a'' = roll acceleration
J = roll angle gain
K = roll rate gain
L = roll acceleration gain
$\omega$ = ship natural roll frequency
n = roll decay coefficient The Ja portion of the command signal is in phase with roll; the Ka' component of the command signal leads roll by 90 degrees, and the La'' leads roll by 180 degrees. Thus increasing the K and L portions of the rudder command signal increases the phase angle by which the roll reduction command signal leads the wave imposed roll angle. At ship roll resonance conditions utilizing the under opposed control relationship (A1) the Ja and La″ terms cancel such that the rudder command signal generated by control law (A1) produces a rudder moment (movement) which leads roll by 90 degrees, i.e., the rudder command signal consists entirely of the Ka′ term. At frequencies above ship roll resonance, the phase angle by which the ideal rudder moment leads roll increases. Thus, the relative importance of the roll acceleration component of the command signal increases above resonance. Below resonance, the phase angle by which the ideal rudder moment leads roll decreases. Thus, the importance of the roll component (Ja) of the command signal increases as frequency decreases below resonance. In fact, at zero frequency the phase angle is zero, and the entire rudder command signal is thus composed of the roll signal term.

To overcome the practical deficiencies of the opposed control assumption (A1) a condensed control law is proposed. This control law relaxes the amount of roll reduction required for nonresonant rolling and it is expressed as:

$$D = Ka' \quad (A3)$$

Using this control equation hereinafter designated as velocity control, rudder movements will occur with a frequency approximating the natural roll frequency of the ship. Velocity control performs most effectively at ship roll resonance conditions where (D) is equivalent to the signal (Ka′) for the opposed control relationship with the rudder moment leading roll by 90 degrees. Thus, like opposed control, velocity control performs most effectively for ships with narrow banded roll responses and the velocity control equation may be modified, if desired, to provide additional roll stabilization by including (Ja) and (La″) considerations. Some idea of the rudder movements under the direction of the control signal may be gained from our experience on ships at sea. At headings forward of beam seas, the ship will tend to roll at a frequency close to its natural or resonance roll frequency while at headings aft of beam seas it will tend to roll with a somewhat lower frequency due to broaching and surfing tendencies. Thus, using a velocity control law at relative headings from head to beam, the rudder will tend to oscillate at the natural roll period with excursions dependent on the values of (K) and the roll rate. At headings aft of beam seas, the rudder will not oscillate as quickly due to the slower roll rate. For a given value of (K) the rudder excursion in quartering and following seas will be less than in beam or bow seas if the roll angles experienced are comparable. This is found to be caused by the lower value of roll rate since the same angular change over a longer time period yields a lower rate of change. Note that this correctly implies that velocity control will not tend to correct a constant heel angle since the roll rate is zero.

The rudder excursion will generally increase with increasing roll angles since the roll rate increases. At first glance this appears to be a favorable phenomenon; specifically, the rudder excursions increase with increasing roll angles thereby generating more stabilizing moments when it is most desired. This would indeed be desirable if the rudder were capable of meeting the demand for larger and larger excursions. Since the roll period will generally be near resonance and does not significantly increase or decrease with roll angle, the rudder is required to move at increasingly rapid rates in order to execute these larger and larger excursions. As the ship roll rate continues to increase, there comes a point at which the rudder cannot move rapidly enough to perform as directed by the control law. This point marks the beginning of rate saturation wherein the rudder excursions due to the command signal begin to fall behind and become de-phased with the roll motion of the vessel. This causes a destabilization of the ship and may produce a large increase in the roll of the ship.

Since rate saturation is highly undesirable, one is tempted to predict the maximum value of roll rate which is likely to be encountered and select a (K) value which will ensure that the rudder rate required by the control law is always less than that available. Although this method is straightforward, it results in rudder excursions which are small in all but extreme conditions and therefore produces small rudder moments, hence small stabilization moments, for all but extreme conditions.

To more efficiently utilize the rudder to control wave and wind induced roll motions, a variable roll rate gain factor (K) is utilized which is related to the magnitude of ship roll and the statistical time-average saturation limit for the rate of rudder movement. The roll reduction second actuator 45 includes a rate gain circuit 47 that determines the statistical average roll rate factor or gain factor (K) for a previous period of time.

Rudder moments near the maximum available from the steering system demand the rudder excursions remain near the maximum allowable without inducing rate saturation.

This criteria is met by the real time computation of a (K) value which, based on the recent time history of roll rate, will allow rate saturation less than one excursion in ten for example. The mathematical derivation of (K) is as follows.

Since roll angle (a) and its derivatives can be considered a stationary random process, and $$D = Ka' \quad (A4)$$

where
D = rudder angle
a′ = roll rate
K = control constant it follows that the oscillatory rudder angle (and its derivatives) used to reduce roll motion is also a stationary random process. Hence, using the relationship
Probability $$(F > \pm F_{LIMIT}) = 1 - erf(F_{LIMIT}/\sqrt{2} \, F_{RMS})$$

$$D' = 0.606 \, |D'|_{LIMIT} \quad (A5)$$

and $$a'_{RMS} = 1.48 \, E(|a'|) \quad (A6)$$

where
D′ = rudder rate
|D′|$_{LIMIT}$ = absolute value of maximum rudder rate available (4.67 deg/sec w/two pumps)
a′$_{RMS}$ = root mean square of roll rate
E(|a′|) = expected absolute value of roll rate, i.e.,
Probability $$\{|a'| > E(|a'|)\} = 0.50$$

The latter expression being employed to simplify the requirements of the physical computation circuitry.

Making the further assemption that roll motion is a narrow banded process, $$a''_{RMS} = \omega_a a'_{RMS} \tag{A7}$$

and hence using equations (A5), (A6), and (A7) in $$D'_{RMS} = K a''_{RMS} \tag{A8}$$

$$K = \frac{0.41 |D'|_{LIMIT}}{\omega_a E(|a'|)} \tag{A9}$$

Thus by accepting the available rudder rate as $D'_{LIMIT}$, knowing the natural period of the vessel, and computing $E(|a'|)$ real time; a (K) value which adapts to the prevailing conditions to yield large rudder excursions and yet not allow unacceptable levels of rate saturation is found. The adaptive rate again circuit within the electrical roll reduction actuator generates a control signal based on this process, thus, $$Ds = Ka' = \left( \frac{0.41 D'_{LIMIT}}{\omega_o E(|a'|)} \right) a' \tag{A10}$$

for example, assuming
a two pump operation and a 10.8 second natural roll period, this law for a ship of the U.S.C.G. WHEC HAMILTON Class becomes, $$Ds = 3.29 a'/E(|a'|) \tag{A11}$$

Under mild sea state conditions the first actuation means comprising first actuator 35 and differential mechanism 36 is normally directly coupled with the flow controls 41. The helm command signal (Dh) is fed to first actuator 35 for translation into an appropriate response for differential mechanism 36. The differential mechanism 36 is mechanically coupled to the flow controls 41 so that the helm command signal (Dh) is translated into a control signal for pumps 21, 26 to produce a directional flow rate of hydraulic fluid in hydraulic circuit 20. This produces a shift in hydraulic mechanism 16 and rudders 15 to a position which is proportional to the directional magnitude of the helm signal (Dh).

The ship roll stabilization system can be activated in adverse sea state conditions or where ship stability is required for aircraft takeoff/landing operations. The roll stabilization system is initially activated when bridge control unit 65 is switched to the standby mode. While the first actuation means is still directly linked with pumps 21, 26 and rudders 15 in the bridge control "standby" mode, the adaptive rate gain circuit 47 of second actuator 45 is determining a statistical roll rate or gain factor K for an elapsed period of time. After a predetermined period of time (on the order of several minutes) the average roll rate gain K has been determined for such period of time and the roll stabilization system is activated by switching bridge control unit 65 from "standby" to "on".

When bridge control unit 65 is switched on, an electrical signal is sent from bridge control unit 65 to mechanical actuator 55 which is mechanically interlinked with mechanical decoupler 60.

This bridge control signal causes mechanical actuator 55 to activate mechanical decoupler 60, which decouples the first actuation means from the flow controls 41 and operatively interlinks the second actuation means (e.g. second actuator 45 and mechanical actuator 55) with the flow controls 41.

Upon switching the roll stabilization system to the "on" position, the roll rate gain factor (K) is combined (e.g. multiplied) with the roll rate (a') in a multiplier circuit 48 of the type manufactured by Analog Devices of Norwood, Massachusetts (Model No. AD533KD). The roll rate gain factor (K) represents a statistical factor which is determined according to the ship roll occurring over a previous predetermined period of time so that, on the average, the rudder stabilizer command (Ka') will not exceed the allowable rudder excursion more than a predetermined number of occurrences during a predetermined period of time. A more detailed discussion of rate gain control 47 is set forth in a copending disclosure entitled "ELECTRICAL ACTUATOR FOR SHIP ROLL STABILIZATION" by Dennis A. Woolaver and Ary E. Baitis, Ser. No. 248,389 filed Mar. 31, 1981 the teachings of which are incorporated by reference. Thus, the roll rate gain factor (K) for high or heavy sea state conditions will be larger than the roll rate gain factor (K) for mild sea state conditions, wherein the roll rate gain factor (K) in high sea states will approach but not generally exceed the allowable rudder movement. The rate of ship roll motion (a') is determined by a roll rate sensor 46 of the type manufactured by Humphrey Inc., San Diego Calif. (Model No. RT-03-0502-1).

The rudder stabilizer command signal (Ds), wherein (DS=Ka'), is combined with the helm control signal (Dh) in a summer amplifier 49 of the type manufactured by Texas Instruments, Fairchild Industries or RCA (type micro A741) to produce a resultant rudder command signal (Drc), where (Drc=Dh+Ds). The superposition of the helm control signal (Dh) and the rudder stabilizer command signal (Ds) is possible, without mutual interference therebetween, in view of the fact that the initial change in course of a ship due to a change in rudder position takes on the order of one-half to one minute while the roll response period of the ship to a rudder movement producing a roll moment is much shorter (eg. on the order of a few seconds). For example, since the waves are assumed to impose a harmonic type of roll motion on the ship (ie. the ship tends to roll to the left and right with equal moments) the net or resultant rudder deflection to reduce ship roll motion over a period of one minute, for example, will statistically approach zero. Thus, the roll stabilization provided by rapid intermittent rudder movements (ie. on the order of a few seconds) is largely independent of the steering controlled rudder movements, which occur less frequently (ie. perhaps one or two per minute).

The superimposed rudder command signal (Drc), where (Drc=Dh+Ds), is sent from summing amplifier 49 to a difference amplifier 50 of the type manufactured by Analog Devices, Norwood, Mass. (Model No. 434B). However, a voltage limiting circuit (not shown) is provided between amplifier units 49 and 50 to limit the ranges of positive-negative voltage signals from summing amplifier 49 so that the rudder command signal (Drc) is compatible (voltagewise) with the rudder position feedback signal (Drp). For example, if it is assumed that the rudder has a freedom of movement of $+/-30°$ and a feedback voltage of 1 volt has been assigned to each 6° of rudder movement the rudder feedback signal (Drp) will have a limit of $+/-6$ volts.

Accordingly, the rudder command signal (Drc) is also limited to a $+/-6$ volts so the resultant difference or error command signal from difference amplifier 50 represents a proper command signal for the rudder.

The resultant error signal (De), where (De=Drc−Drp), from difference amplifier 50 is sent to a second difference amplifier 51 of the same type manufacture as difference amplifier 50. A second voltage limiting circuit (not shown) is provided between amplifier units 50 and 51 to limit the voltage signals from the difference amplifier 50 so that the error signal (De) is compatible (voltagewise) with the swash plate angle feedback signal (Dpa). The swash plate flow controls 41 for pumps 21,26 are normally arranged so that the swash plate flow control moves with equal magnitude in the positive and negative direction from a neutral position, wherein such movement produces a proportional flow response in the pumps 21,26. Thus, if it is assumed that a maximum voltage of +/−0.2 volts is assigned to a corresponding maximum deflection (+/−) of the swash plate flow control 41, the error signal (De) will also be limited by the second limiting circuit to a +/−0.2 volt maximum. The signals (De) and (Dpa) combined in the second difference amplifier 51 and the resultant signal (Dsp) causes the swash plate flow control 41 to move to a predetermined position.

The second limiting circuit thereby allows the rudder mechanism to move in an "asymptotic" mode whereby rapid initial rudder movements of the rudders 15 are produced in response to a changing rudder command (Drc) and a declining rate of rudder movement occurs as the rudders approach the desired position. The second limiting circuit achieves this purpose by truncating error signals (De) from difference amplifier 50 that are larger than +/−0.2 volts and forwarding a signal of ±0.2 volts. The swash plate flow controls 41 move in response to the modified error signal (De) so that the swash plate feedback signal (Dpa) matches the modified error signal (De) and the resultant swash plate command signal (Dsp) approaches zero. As the error signal (De) from difference amplifier 51 decreases below ±0.2 volts the second limiting circuit no longer truncates the voltage signal and the swash plate flow control 41 begins to move from its former maximum deflection position (eg. where Dpa=±0.2 volts). As the error signal (De) continues to decrease, the swash plate position signal (dpa) also decreases until both are zero. At this point the rudders 15 will have reached their predetermined position and swash plate flow control 41 will be at the neutral position so that the flow of fluid through pumps 21,26 will have terminated. Thus, the electrical actuator 45 allows rapid rudder movements for error signals (De) above ±0.2 volts and an "asympotically" decreasing rate of rudder movements for error signals (De) below ±0.2 volts. This is important since the requisite change in rudder position to reduce ship roll may occur during a period of several seconds.

Obviously many modifications and variations of this invention are possible in light of the above teachings. It is therefore to be understood that within the scope of the appended claims the invention may be practiced otherwise than as specifically described.

What is claimed is:

1. A ship stabilization system which utilizes the rudders to compensate for wave and wind induced roll motions, comprises:
   a hydraulic control means connected to the rudders for controlling the position of the rudders;
   a pump means coupled to the hydraulic control means for controlling the flow of fluid thereto to produce a predetermined rudder movement; a roll rate sensor for producing roll rate signals (a');
   flow control means connected to the pump means for controlling the flow rate of fluid through the pump means;
   a first actuation means having a first input for receiving said roll rate signal and a second input for receiving helm steering command signals and being connected to the flow control means for translating helm steering command signals into control impulses for the flow control means;
   a second actuation means connected to the flow control means for forming a roll reduction control signal from said roll rate signal translating said helm steering command signals and helm roll reduction control signals into a control impulse for the flow control means; and
   coupling means connected to the first and second actuation means and the flow control means for disengaging the first actuation means from the flow control means during the period of time that the second actuation means is operating.

2. A ship stabilization system which utilizes the rudders to compensate for wave and wind induced roll motions, comprises:
   a hydraulic control means connected to the rudders for controlling the position of the rudders;
   flow control means connected to the hydraulic control means for controlling the flow of hydraulic fluid in the hydraulic control means to produce a predetermined rudder movement;
   a roll rate sensor for producing roll rate signals (a'); and
   a roll reduction actuation means having a first input for receiving said roll rate signal and a second input for receiving helm steering command signals and being connected to the flow control means for forming a roll reduction control signal from said roll rate signal translating said helm steering command signals and said roll reduction control signals into a control impulse for the flow control means.

3. The ship stabilization system according to claim 2, wherein:
   the roll reduction control signals consist of the current roll rate (a') of the ship and a roll rate gain factor (k), which is multiplied therewith to produce a resultant roll reduction control signal (Ds) equivalent to (Ka').

4. The ship stabilization system according to claim 3, wherein:
   the roll rate gain factor (K) is based on the statistical time-average value of the ship roll rate for a previous predetermined period of time and the allowable rate saturation limit of the rudder rate movement such that the rudder rate movement will exceed the rudder rate movement saturation limit a certain average number of occurrences during a predetermined period of time.

5. The ship stabilization system according to claim 3, wherein:
   the roll reduction control signal (Ds) and the helm steering command signal (Dh) are added together in a summing device to produce a resultant rudder command signal (Drc).

6. The ship stabilization system according to claim 5, further comprising:
   a means for determining the position of the rudders with reference to a neutral position and for producing a rudder angle position signal (Drp) that represents the deflection of the rudder from the neutral position, the rudder angle position signal (Drp) subtracted from the resultant rudder command signal (Drc) to produce a resultant error signal (De) that is equivalent to (Drc-Drp).

7. The ship stabilization system according to claim 6, further comprising:

a means for determining the position of the flow control means with reference to a neutral position and for producing a flow control means position signal (Dpa) that represents the deflection of the flow control means from the neutral position, the flow control means position signal (Dpa) subtracted from the resultant error signal (De) to produce a resultant flow control means signal (Dsp) that is equivalent to (De-Dpa), and the resultant flow control means signal (Dsp) fed to the flow control means for the operation thereof.

* * * * *